US007181700B2

(12) United States Patent
Guerrero

(10) Patent No.: US 7,181,700 B2
(45) Date of Patent: Feb. 20, 2007

(54) METHOD AND SYSTEM FOR SIMULATING HYPETEXT MARKUP LANGUAGE CONTROL COMPONENTS WITH GRAPHICAL CONTROL COMPONENTS

(75) Inventor: Jaime F. Guerrero, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 664 days.

(21) Appl. No.: 10/163,218

(22) Filed: Jun. 4, 2002

(65) Prior Publication Data

US 2003/0222910 A1 Dec. 4, 2003

(51) Int. Cl.
*G06F 3/01* (2006.01)
*G06F 3/048* (2006.01)
(52) U.S. Cl. .................... 715/810; 715/780; 715/812
(58) Field of Classification Search ............. 715/704, 715/744, 810, 808, 845, 764
See application file for complete search history.

(56) References Cited

U.S. PATENT DOCUMENTS

| | | | | |
|---|---|---|---|---|
| 5,845,122 | A * | 12/1998 | Nielsen et al. | 715/810 |
| 5,986,654 | A * | 11/1999 | Alexander et al. | 715/744 |
| 6,208,340 | B1 * | 3/2001 | Amin et al. | 715/808 |
| 6,407,760 | B1 * | 6/2002 | Aritomi | 715/810 |
| 6,480,852 | B1 * | 11/2002 | Himmel et al. | 707/10 |
| 6,535,229 | B1 * | 3/2003 | Kraft | 715/764 |
| 6,901,556 | B2 * | 5/2005 | Bosma et al. | 715/769 |
| 6,959,423 | B2 * | 10/2005 | Bosma et al. | 715/845 |
| 2002/0154166 | A1 * | 10/2002 | Sanders et al. | 345/764 |

OTHER PUBLICATIONS

W3C.org et al, "HTML3.2 Reference Specification", Jan. 1997 http://www.w3.org/tr/REC=html32 pp. 1-44.*
Flanagan, David, et al. "User Interfaces with HTML and JavaScript" Feb. 1999 pp. 1-9 http://web.archive.org/web/19990209173759/http://w3j.com/5/s3.flanagan.html.*
Chuck Neal, et al. "Custom check and Radio Buttons", 1999. pp. 1-2 http://www.mediamacros.com/item/item-986156739.*
JS-Examples.com et al, "JavaScript Examples—Graphical Form Radio Buttons and Checkboxes", Jul. 2000, pp. 1-9 http://www.js-examples.com/javascript/?view=155.*
W3C.org et al, "Document Object Model" Oct. 1998 http://www.w3c.org/tr/1998/REC-DOM-LEVEL-1-19981001/introduction.html.*

(Continued)

*Primary Examiner*—Weilun Lo
*Assistant Examiner*—Steven Theriault
(74) *Attorney, Agent, or Firm*—Robert C. Kowert; Meyertons, Hood, Kivlin, Kowert & Goetzel, P.C.

(57) ABSTRACT

A method and system for web based graphical control components. Specifically, the present invention describes a method of graphically displaying a graphical user interface (GUI) control component within a hypertext markup language (HTML) web page. The present invention optionally displays a label associated with a displayed GUI control component. A JavaScript routine is invoked in response to user input, and based thereon a selected image file is selected from a plurality of image files. The plurality of image files correspond to respective user selectable options for responding to the label. The selected image file is then displayed in the GUI control component on the HTML web page. The JavaScript routine employs a unique naming scheme for name tags of a plurality of sequentially associated slave objects of a master object for more concise referencing.

31 Claims, 10 Drawing Sheets

The variable A, B, or C in a Circle Indicates That Variable is Exclusively Selected.

OTHER PUBLICATIONS

McFedries, Paul et al. "Special Edition Using JavaScript" Jun. 2001.*

Apple Computer, Inc., "Radio Buttons", Inside Macintosh: Mac OS 8 Human Interface Guidelines/Chapter 2—Control Guidelines, Jul. 18, 1997, 2 pages.

Apple Computer, Inc., "Checkboxes", Inside Macintosh: Mac OS 8 Human Interface Guidelines/Chapter 2—Control Guidelines, Jul. 18, 1997, 2 pages.

Microsoft Corp., "Conditional Comments, Radio Buttons", Michael Wallent, Jul. 17, 1998, 4 pages.

* cited by examiner

510 → [410]  Graduate Degrees? ~515

520 → [420]  Licensed to Drive? ~525

530 → [430]  Has Pets? ~535

500

METHOD AND SYSTEM FOR SIMULATING HYPETEXT MARKUP LANGUAGE CONTROL COMPONENTS WITH GRAPHICAL CONTROL COMPONENTS

BACKGROUND OF THE INVENTION

1. Field of the Invention

Embodiments of the present invention relate to the field of web based control components. More particularly, embodiments of the present invention relate to the graphical simulation of hypertext markup language control components.

2. Related Art

Network environments allow a worldwide collection of networks (e.g., the Internet) and users on those networks to communicate with each other. Users accessing the Internet through a web browser can access and interact with content from web sites that are located on the Internet. Web sites located on the Internet comprise a group of related documents, associated files, script routines, and databases. A server manages and controls the websites that are associated with the server to present content within the websites to the accessing users.

The content provided within the web page is created using hypertext markup language (HTML). The HTML language uses tags to mark elements (e.g., text and graphics) in a document to provide a layout for displaying the content to web browsers that are associated with users requesting the web page contents.

Web pages can allow for interaction between a user and the content within the web page. For example, surveys or informational displays may be presented to a user for their input. Control widgets or components that are HTML based can be used for displaying and allowing a user to manipulate a data parameter, that is associated with an object, within a web page. Two control widgets that are HTML based are checkboxes and radiobuttons. Ordinarily, the checkbox and radiobutton control widget is implemented in standard HTML by the use of an INPUT tag with the TYPE attribute value set to the value of checkbox or radiobutton, respectively.

Standard HTML control widgets are limited to two conditions, such as, the Boolean conditions of true and false. As a drawback, a web page implementing a parameter for manipulation by a checkbox or radiobutton implemented in standard HTML cannot express a situation beyond the two conditions.

For example, checkbox widgets are designed for displaying and allowing a user to manipulate a data parameter that either exhibits a true or false condition. It is not normally considered possible for both true and false to be presented simultaneously, at least, when displaying or allowing the manipulation of properties of a single data parameter. For example, in the case of a single object, a checkbox can be used to determine whether that object, a person, has obtained a graduate degree. A checkbox is adequate for showing a true or false condition of whether or not the person has graduate degree.

Mixed value or partially true situations can arise for checkboxes on a system (e.g., survey) where more than one object can be selected by the user, and where a screen showing the data parameter of those objects can be invoked. Consider an example where each selectable person object is associated with a data parameter expressing whether that person has a graduate degree, or not. In the case where person A has a degree and person B does not have a graduate degree, a property screen can display and allow manipulation of a data parameter related to those objects. If the objects include person A and B, the data parameter relating to attaining a graduate degree would need to reflect a partially true situation, since only A has a graduate degree. In order to present the information correctly, the checkbox needs to show that the data parameter relating to attaining a graduate degree is both true and false, a mixed value situation.

In another case, radiobutton control widgets are designed for displaying and allowing a user to manipulate a data parameter that can have only one of a few possible spelled-out choice values (e.g., 1 of N choices). This is accomplished by presenting a list of the N choices in a radiobutton set. In standard HTML systems, an indicator next to each choice suggests either that the choice is the current choice (true) or is not the current choice (false). It is not normally considered possible for more, or less, than one choice in a radiobutton set to have a true condition associated with it, at least when displaying or allowing manipulation of parameters of a single object.

Mixed value situations can arise for radiobutton sets on a system where more than one object is considered by a user in a radiobutton set. The user manipulates a screen showing the choices associated with the radiobutton set where a selection can be invoked. Considering an example where a selectable color parameter has the choices of red, white, or blue, and where the color parameter is normally displayed and manipulated using a radiobutton set.

In the case where two objects, objects A and B, are considered in a radiobutton set, object A may have the color red and object B may have the color blue. When the user's selection includes both objects A and B for the color parameter, a mixed value situation arises in the radiobutton set displaying the color parameter. In order to present the information correctly, the radiobutton set needs to show that both red and blue are non-exclusively true, such that, each color is true for certain objects. In this case, the color white would be definitely false since none of the objects are white.

In addition, searching algorithms within a program are used to search for objects within a document object model (DOM). Generally this employs a methodical and sequential searching technique to locate an object of interest within the DOM. The technique usually scans the document and compares each of the objects within the DOM to the object of interest until the object is found within the DOM.

Execution of the searching algorithm within a JavaScript program can be slow and inefficient. For example, the hand-coded searching algorithm must perform its sequential and methodical search as implemented in the interpreted JavaScript environment.

Also, multiple hand coded lines within the program are necessary to implement the searching algorithm. Since the searching algorithm is hand coded, the traditional method involves code which increases the size of the program, its complexity, and the likelihood of bugs or errors in implementation.

As such, standard HTML control widgets are inapplicable in partially true or mixed value situations since they are unable to express conditions beyond Boolean expressions of true and false conditions. Also, traditional methods of searching for objects in a DOM are slow, and because of the multiple lines of code, subject to implementation errors.

SUMMARY OF THE INVENTION

Embodiments of the present invention disclose a method and system for web based graphical control components.

Another embodiment of the present invention discloses a method for a naming scheme for name tags in a JavaScript routine implementing the graphical control components for more concise referencing.

Specifically, the present invention describes a method of rendering a graphical user interface (GUI) control component within a hypertext markup language (HTML) web page. The present invention optionally displays a label associated with a displayed GUI control component. A JavaScript routine is invoked in response to user input, and based thereon a selected image file is selected from a plurality of image files. The plurality of image files correspond to respective user selectable options for responding to the label. The selected image file is then displayed in the GUI control component on the HTML web page.

A hyperlink within the image files, that when selected, provides the input to invoke the JavaScript routine for selecting the current state of the simulated control component. In one embodiment, the GUI component is a checkbox. In another embodiment, the GUI component is a radiobutton in a radiobutton set.

Furthermore, a method for referencing objects by using a multipart naming scheme and associative-array indexing for name tags of a plurality of sequentially associated slave objects of a master object is employed for more concise referencing in a JavaScript routine, in another embodiment. The Boolean conditions (e.g., true and false conditions) and the third condition, that is a mixture of the Boolean conditions, comprise the plurality of sequentially associated slave objects in the JavaScript routine. The naming scheme can comprise a first and second part that are concatenated into a single character string. The first part is the master object and the second part is the sequential order of the corresponding slave object.

DETAILED DESCRIPTION OF THE INVENTION

Figure 1:
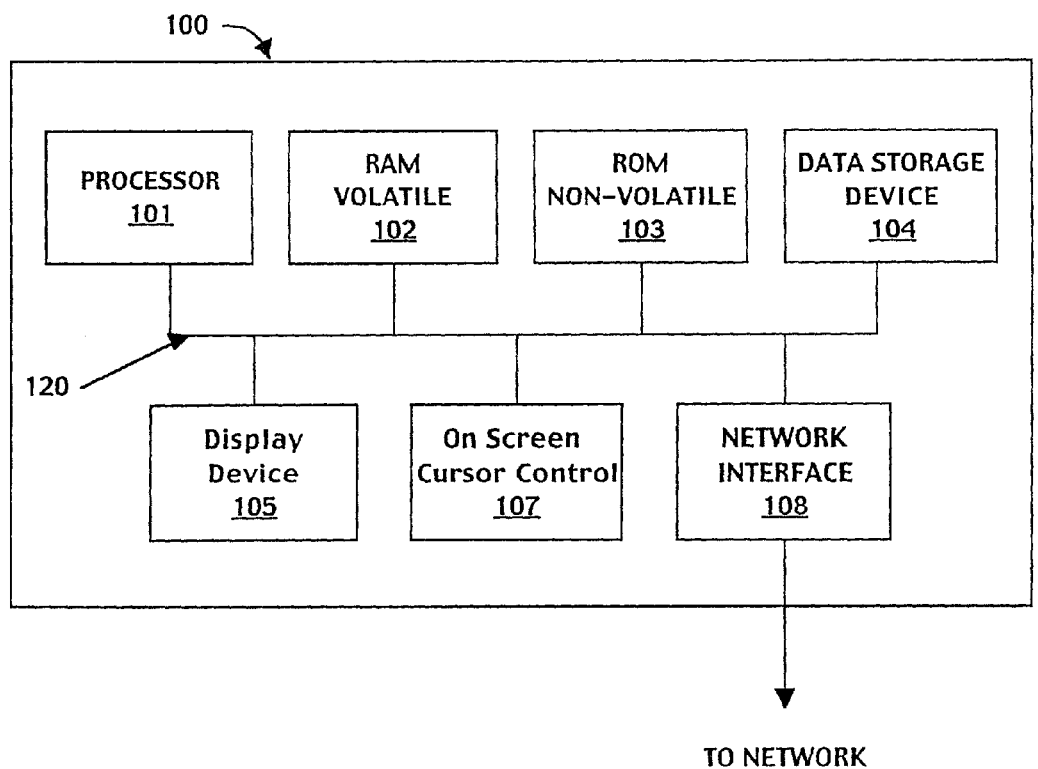
FIG. 1 is a logical block diagram of an exemplary computer system capable of displaying a graphical user interface (GUI) control component, in accordance with an embodiment of the present invention.

Reference will now be made in detail to the preferred embodiments of the present invention, a method and system for web based graphical control components, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "simulating," "providing," "storing," "creating," "invoking," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Referring to FIG. 1, embodiments of the present invention are comprised of computer-readable and computer-executable instructions which reside, for example, in computer-readable media of a computer system, such as those accessible by a user for accessing the Internet through a web browser. FIG. 1 is a block diagram of exemplary embedded components of an electronic system, such as, computer system 100, upon which embodiments of the present invention may be implemented.

Exemplary computer system 100 includes an internal address/data bus 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, and a non-volatile memory 103 (e.g., read only memory (ROM), programmable ROM, flash memory, EPROM, EEPROM, etc.) coupled to the bus 120 for storing static information and instructions for the processor 101.

Exemplary computer system 100 also includes an optional data storage device 104 (e.g., memory card, hard drive, etc.) coupled with the bus 120 for storing information and instructions. Data storage device 104 can be removable. As described above, exemplary computer system 100 also contains an electronic display device 105 coupled to the bus 120 for displaying information to the computer user.

System 100 also includes an optional cursor control or directing device 107 coupled to the bus 120 for communicating user input information and command selections to the central processor 101.

With reference still to FIG. 1, an optional signal Input/Output (I/O) device 108 is shown. The I/O device 108 is coupled to bus 120 for providing a communication link between the computer system 100 and other electronic devices. As such, signal I/O device 108 enables the central processor unit 101 to communicate with or monitor other electronic systems that are coupled to the computer system 100, possibly through a network (e.g., the Internet).

Rendering Graphical User Interface Control Components

This disclosure describes a method and system for rendering a graphical user interface (GUI) control component in a web page environment. Another embodiment of the present invention discloses a method for a naming scheme for name tags in a document object model (DOM) associated with a JavaScript routine that implements the graphical control components for more concise referencing.

The present invention is discussed within the context of control components, otherwise known as widgets to some well versed in the art. A control component is a portion of a user interface screen that is used, by a user, to review and manipulate data on a screen, such as, a web page. A control component is unique from content, which is typically text and graphics. Content generally can only be read or viewed and not manipulated. Control components, on the other hand, can be read and manipulated, such as, to express a condition of a data parameter. A control component can be built and presented in a standard fashion and can appear many times on a web page. The control components look and behave similarly, except for unique aspects of each control component, such as, its label or list of choices.

Figure 2:
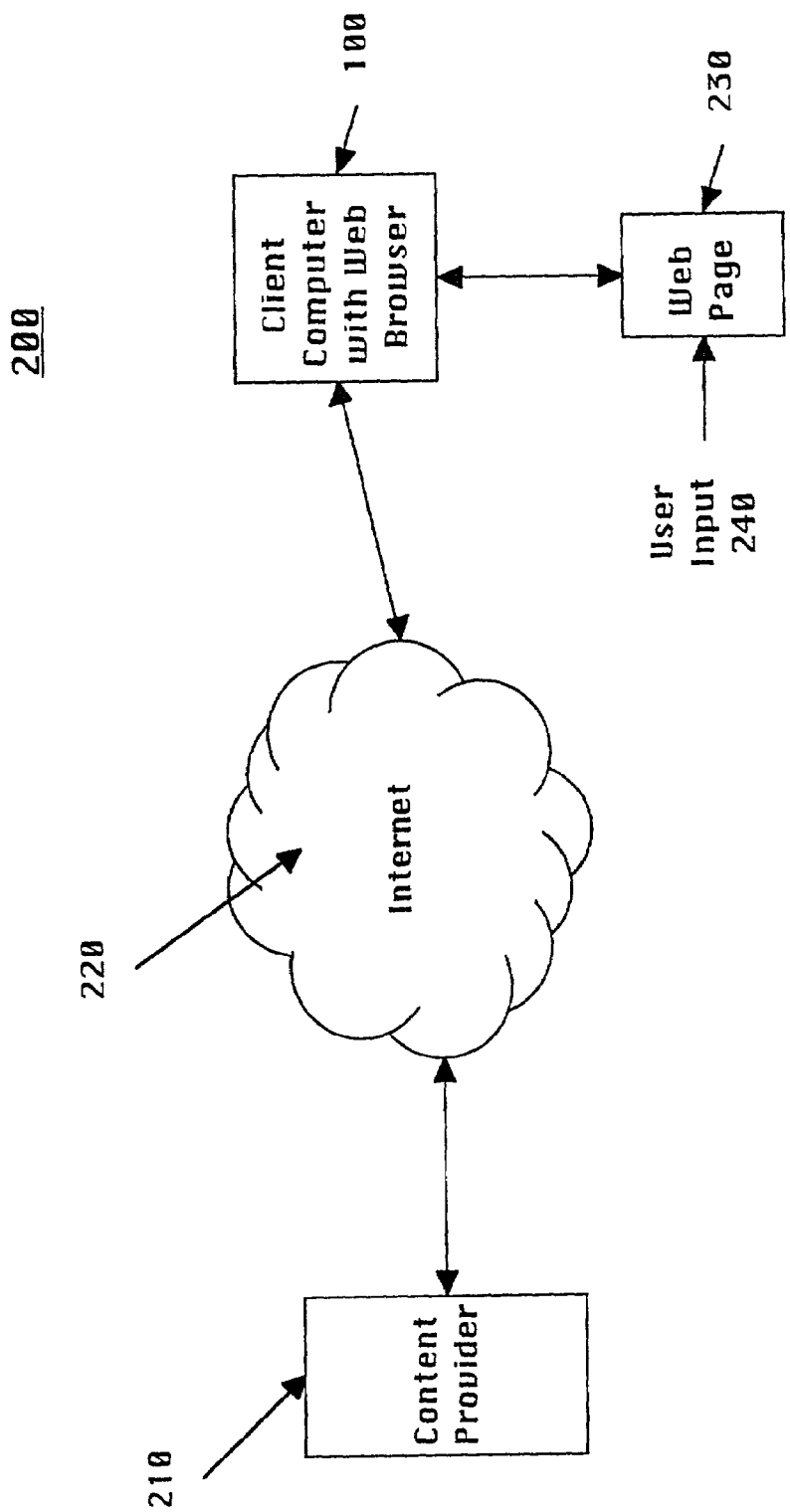
FIG. 2 is a block diagram of an exemplary communication system implementing the display of GUI control components within the context of a hypertext markup language (HTML) web page environment, in accordance with one embodiment of the present invention.

FIG. 2 depicts an exemplary communication system 200 capable of implementing GUI control components within a hypertext markup language (HTML) web based environment, in accordance with one embodiment of the present invention. In system 200 a content provider 210 (e.g., a server computer) provides information, such as an HTML document, for viewing or distribution over a network 220 (e.g., Internet). A client computer 100 with a web browser accesses the network 220 for requesting the information from the content provider 210.

In one embodiment, a web page 230 is requested by the client computer 100 from the content provider 210. The web page supplied by the content provider 210 contains GUI control components in the form of graphical images. The graphical control components respond to user input 240, such as, clicks, etc.

Figure 3:
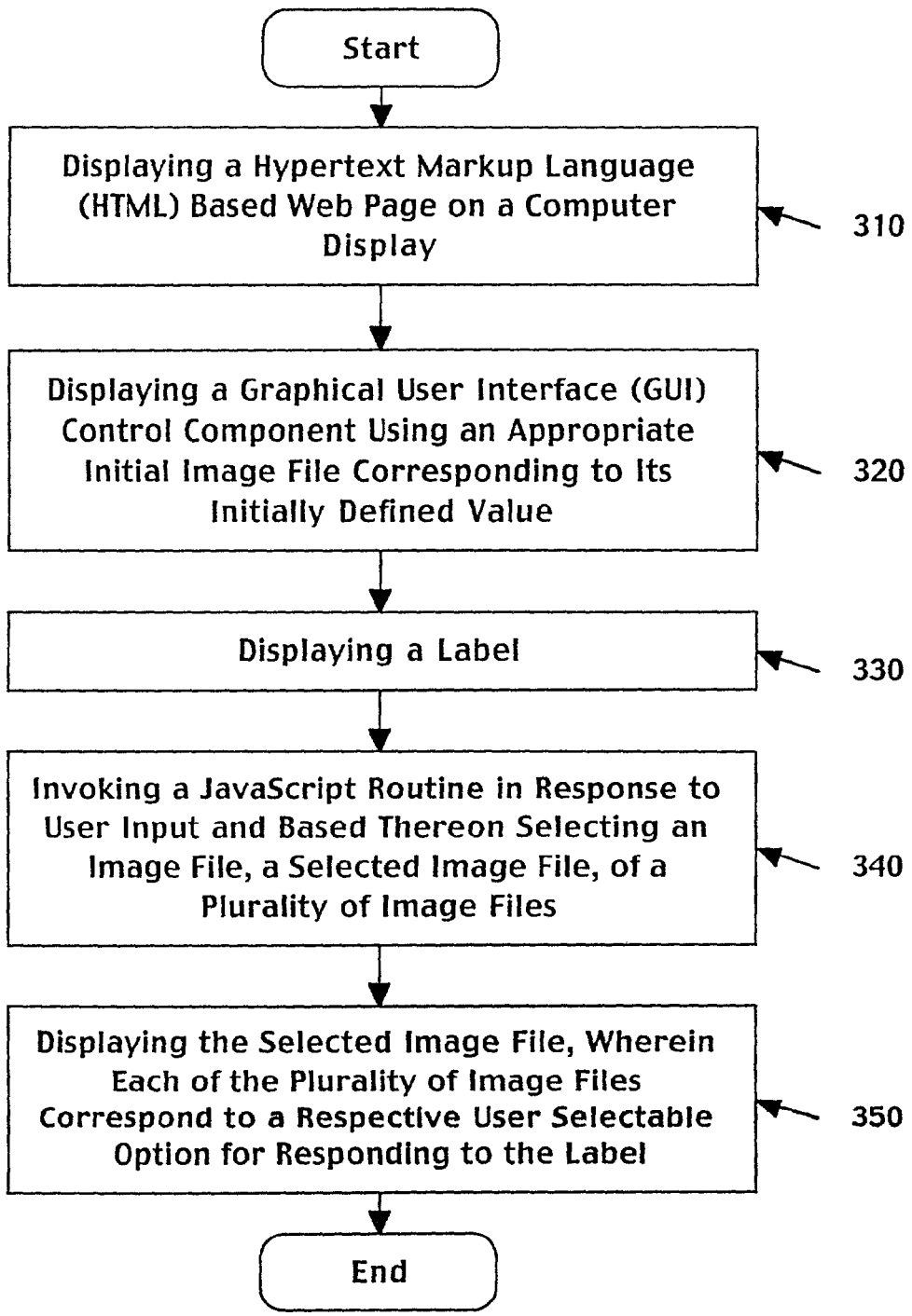
FIG. 3 is a flow chart illustrating steps in a method for displaying GUI control components with graphical images on a web page, in accordance with one embodiment of the present invention.

FIG. 3 is a flow chart 300 illustrating steps in a computer implemented method of rendering GUI control components within a web based environment, in accordance with one embodiment of the present invention. The present embodiment begins by displaying an HTML based web page on a computer display. The web page can be one that is requested by a user of the computer system 100 coupled to the network 200 of FIG. 2.

In one embodiment, the GUI control components replace standard HTML input control components that are limited to two conditions of expression, e.g., the Boolean expressions of either true or false conditions. The GUI control components of the present embodiment are capable of responding to user input.

In step 320, the present embodiment renders or displays a GUI control component within the HTML web page. The GUI control component is displayed in its initial state by the invoking the appropriate image file from a plurality of image files.

In step 330, another embodiment displays a label that is associated with the GUI control component. The label can be optionally displayed, in one embodiment. The label presents or introduces the plurality of selectable options that is associated with the GUI control component. For example, the label could inform the user of the nature of the data parameter associated with the GUI control component. For example, the data parameter may indicate to a user whether one or a group of objects have graduate degrees.

While embodiments of the present invention are presented with labels, other embodiments are well suited to other presentation means for introducing the plurality of selectable options, such as, icons, symbols, etc.

In step 340, the present embodiment invokes a JavaScript routine that is in response to user input. The JavaScript routine selects an image file from a plurality of image files. The selected image file that is displayed indicates the new current state of the GUI control component depending on the user input and the prior state. In one embodiment, the prior state of the GUI control component and the initial state of the GUI control component determine the new selected image file from the plurality of image files.

The present embodiment provides three selection options for display of the current state of the GUI control component. The first and second selection options for display are the two conditions associated with the HTML control component (e.g., the Boolean conditions of true and false conditions). The third selection option for display of the current state of the GUI control component is a mixed value of the first and second selection options. For example, in the case where Boolean expression are used for the first and second selection option, the third selection option is a mixed value of the Boolean expressions, and reflects a partially true condition.

In step 350, the selected image file is displayed. In one embodiment, the current state, or the selected image file, of the GUI control component can be stored in a hidden field that is a hidden INPUT tag.

Figure 4:
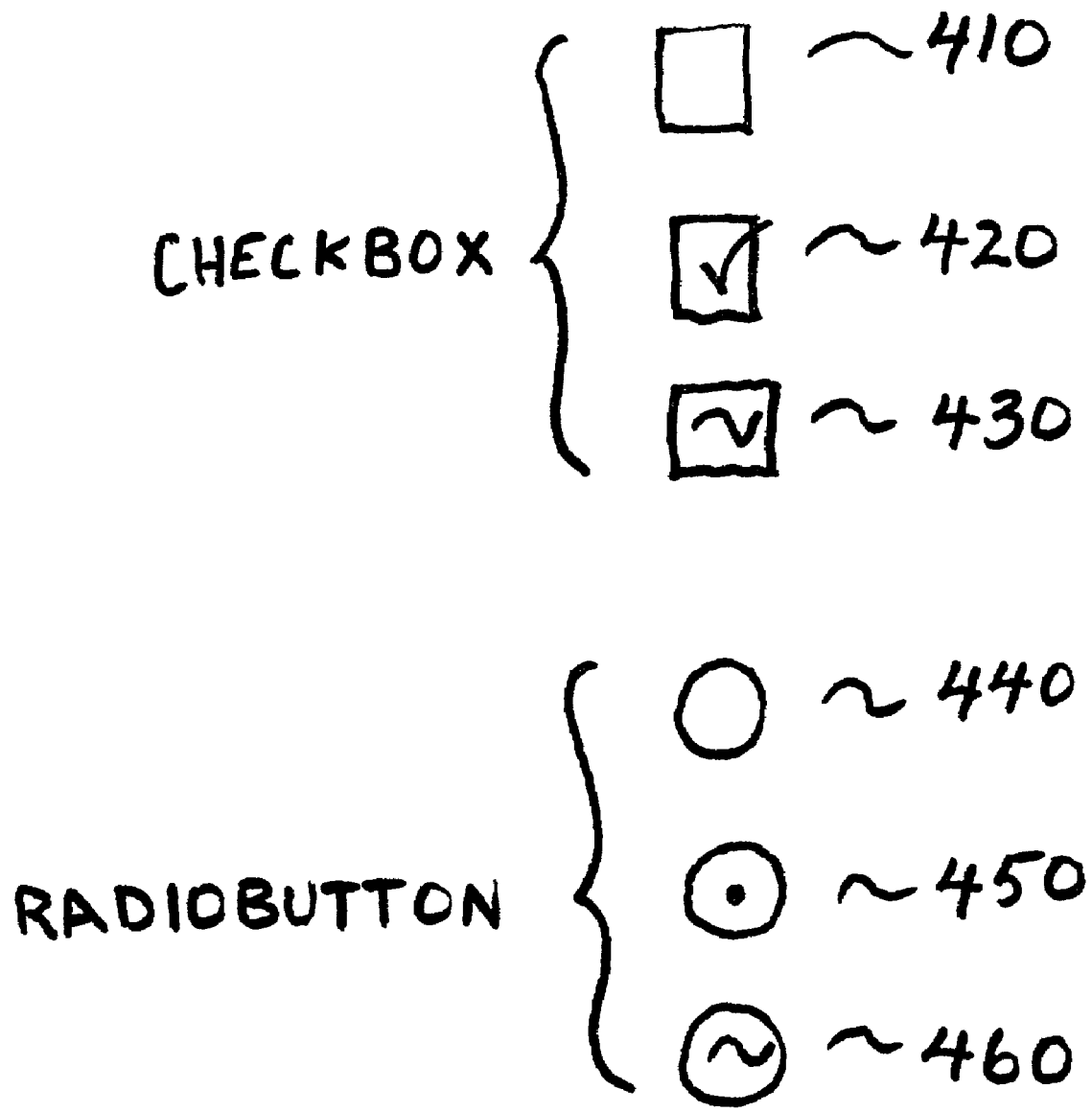
FIG. 4 is a diagram illustrating checkbox control components and radiobutton control components that are capable of expressing a mixed value condition, in accordance with one embodiment of the present invention.

FIG. 4 is an illustration of the screen displayed graphics employed for rendering a GUI control component in an HTML web page environment, in accordance with one embodiment of the present invention. FIG. 4 illustrates the various states of a checkbox GUI component in images 410, 420, and 430. In addition, FIG. 4 illustrates the various states of a radiobutton GUI component in images 440, 450, and 460.

Since the checkbox and radiobutton GUI components in FIG. 4 are capable of each expressing three different states, the checkbox and radiobutton GUI components can be used for expressing a data parameter of one or more objects.

The images in FIG. 4 are provided for illustration, brevity, and clarity. However, embodiments of the present invention are well suited to using various other images for expressing the same or similar conditions (e.g., true, false, and mixed value conditions). In addition, embodiments of the present invention are well suited to using graphical images for expressing various states beyond the Boolean expressions and the mixed value conditions.

The checkbox and radiobutton images in FIG. 4 are displayed for user interaction in a web based environment, in accordance with one embodiment of the present invention. The graphical images in FIG. 4 can be displayed in an HTML document, such as the web page 230 of FIG. 2. Image files or objects are instantiated in a JavaScript program to create the graphical images of FIG. 4 (images 410, 420, 430, 440, 450, and 460), in one embodiment. Also, multiple IMG tags can be used to render the initial graphical images of FIG. 4.

In addition, each of the images of FIG. 4 responds to user input for altering the state or condition of the data parameter associated with the GUI control component that is expressed by the checkbox or radiobutton images of FIG. 4, in accordance with one embodiment of the present invention. A user interacts with the graphical images of FIG. 4 to alter the state of the data parameter, or corresponding GUI control component. For example, a user can click on the specific graphical image displaying a GUI control component that thereby invokes the JavaScript routine for altering the state of that GUI control component.

In one embodiment, an A tag invokes the JavaScript routine. The A tag represents a hyperlink that is invoked by user input (e.g., clicking on the graphical image). The hyperlink invokes the JavaScript routine for altering the state of the data parameter. As such, the graphical image is a clickable graphic that responds to user input. The initial state of the data parameter is effected by the appropriate IMG tag being in place in the original HTML web page.

Image 410, an empty box, illustrates a checkbox GUI component exhibiting a false condition for a data parameter. Image 420, a checked box, illustrates a checkbox GUI component exhibiting a true condition for a data parameter. So far, the images in image 410 and 420 provide the same functionality as the standard HTML checkbox control components. In the present embodiment, a check within a box exhibits a true condition.

However, the present embodiment also provides an additional state or condition for the checkbox GUI component associated with the data parameter in image 430. A mixed value condition is expressed in image 430 that indicates the data parameter is partially true. For example, in a case where a data parameter is tracking whether two or more person objects in a group of objects have graduate degrees, some person objects may have a graduate degree, while others in the same group of objects do not have graduate degrees. In the present embodiment, a glyphic tilde within a box expresses the partially true condition, as shown in image 430.

Figure 5:
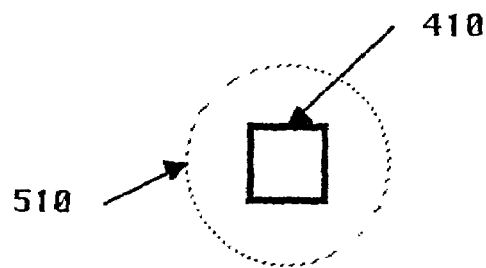
FIG. 5 is a diagram of a web page illustrating checkbox control components, in accordance with one embodiment of the present invention.
Figure 5:
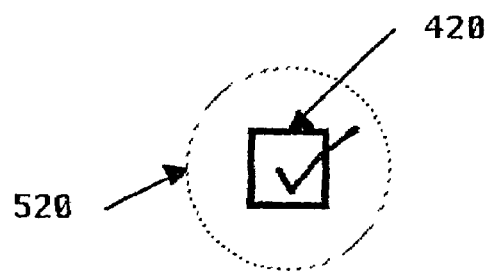
Figure 5:
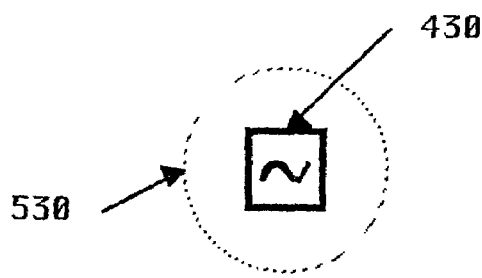

Referring now to FIG. 5, three exemplary data parameters are illustrated for a group of N objects (e.g., persons) on a web page 500. In the first parameter, checkbox GUI component 510 displays whether the group of N objects as a whole have graduate degrees. The checkbox GUI component 510 is associated with label 515, "Graduate Degrees?" The graphical image 410, an empty box, is selected and displayed for the checkbox GUI component 510 to illustrate that none of the objects within the group of N objects have a graduate degree.

In the second parameter, checkbox GUI component 520 displays whether the group of N objects as a whole are licensed to drive. The checkbox GUI component 520 is associated with label 525, "Licensed to Drive?" The graphical image 420, a checked box, is selected and displayed for the checkbox GUI component 520 to indicate that all within the group of N objects are licensed to drive.

In the third parameter of FIG. 5, the checkbox GUI component 530 displays whether the group of N objects as a whole have pets. The checkbox GUI component 530 is associated with label 535, "Has Pets?" The graphical image 430, a box with a glyphic tilde, that is selected and displayed for the checkbox GUI component 530 indicates a mixed value condition where only some within the group of N objects have pets.

For a checkbox condition, selecting the state of a data parameter, such as, those data parameters associated with checkbox GUI components 510, 520, and 530, can be implemented on a rotating basis with an invoked JavaScript routine, in accordance with one embodiment of the present invention. For example, the current state of the data parameter illustrated by checkbox GUI component 510 can be selected through user input, e.g., clicking on the checkbox GUI component 510. As discussed previously, the user input (e.g., a click on the checkbox GUI component 510) invokes a JavaScript routine associated with the checkbox GUI component 510. In the present embodiment, the JavaScript routine rotates the graphical image displayed in the checkbox GUI component 510 to the next graphical image to be presented, such as the true condition illustrated by image 420.

Figure 8:
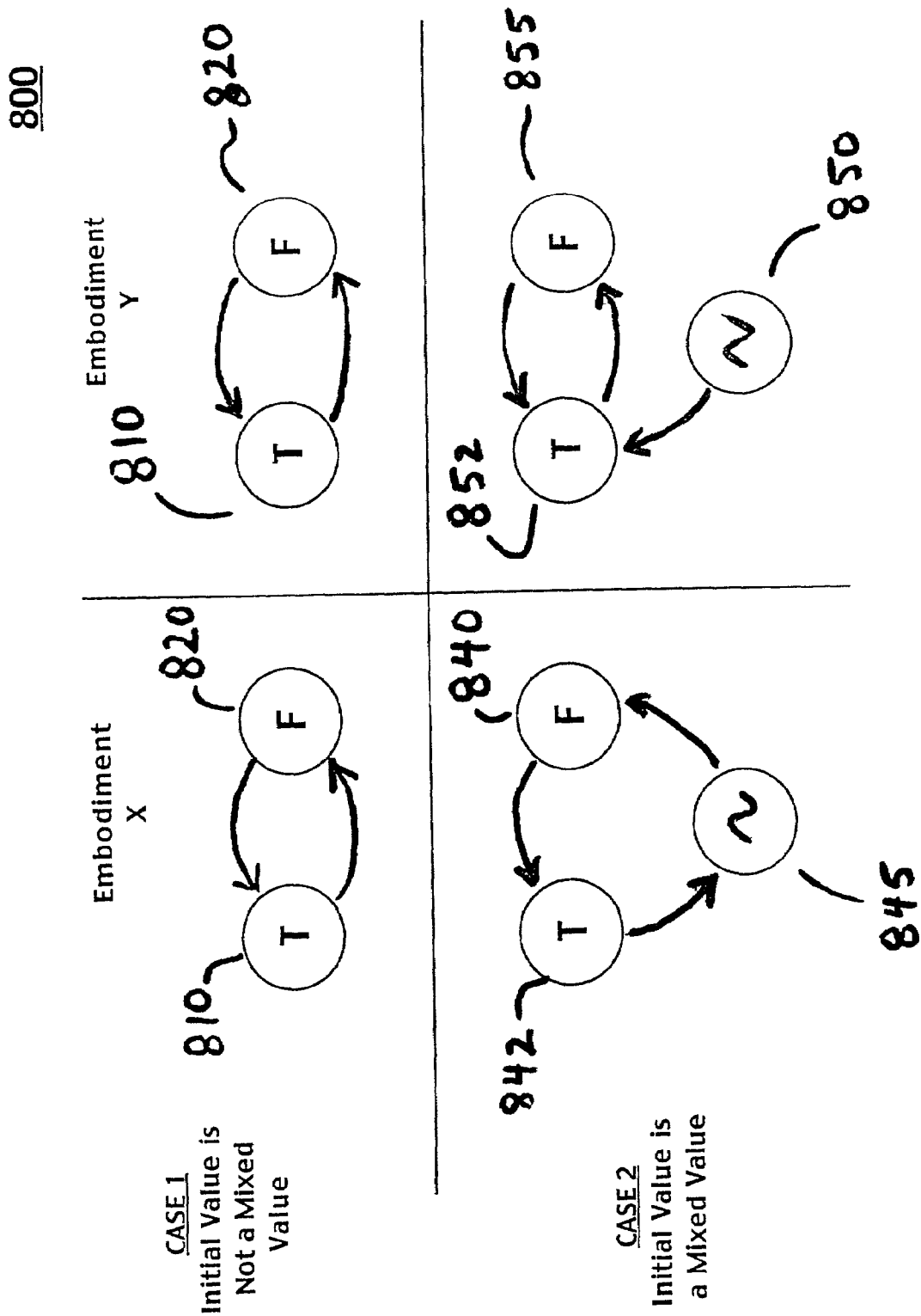
FIG. 8 is a diagram illustrating transition states for a checkbox control component, in accordance with one embodiment of the present invention.

FIG. 8 is a diagram 800 illustrating exemplary state transitions for any checkbox component (e.g., any checkbox component 510, 520, or 530 of FIG. 5). For example, Table 1 shown below illustrates the corresponding state transitions for the checkbox component as shown in FIG. 8, in embodiments of the present invention. The diagram 800 in FIG. 8 illustrates two exemplary embodiments, embodiment X and embodiment Y. For both embodiments, two cases are presented. In case 1, the initial value is not a mixed value. In case 2, the initial value is a mixed value.

TABLE 1

State Transitions for Checkboxes

| | Embodiment X | | | Embodiment Y | | |
| --- | --- | --- | --- | --- | --- | --- |
| | IF | | THEN | IF | | THEN |
| Case | Initial Value | Current State | Next State | Initial Value | Current State | Next State |
| Case 1 | T | T | F | T | T | F |
| | T | F | T | T | F | T |
| | F | T | F | F | T | F |
| | F | F | T | F | F | T |
| Case 2 | Mixed | T | Mixed | Mixed | Mixed | T |
| | Mixed | F | T | | | |
| | Mixed | Mixed | F | | | |

The selection of the order of graphical images can vary depending on embodiment and initial value. Referring now to case 1 of FIG. 8, the selection of the graphical images depends on the initial state of the checkbox GUI component, in embodiments of the present invention. For case 1, the initial value of a checkbox GUI component is not a mixed value 430. For embodiments X and Y, if the initial state of the checkbox GUI component is either the false condition (graphical image 410) or the true condition (graphical image 420), then these embodiments X and Y will not allow the checkbox GUI component to show the mixed value condition (graphical image 430). In that case the checkbox GUI component as shown in FIG. 8 will display and rotate between the Boolean expressions of false and true. The JavaScript routine will not allow the mixed value condition (graphical image 430) to be displayed for that checkbox GUI component.

For example, in both embodiments X and Y, if the checkbox GUI component is displaying a true condition 810, then when selected (e.g., by clicking on the checkbox GUI component), the next condition displayed would be the false condition 820. Correspondingly, if the checkbox GUI component is displaying a false condition 820, then when selected, the next condition displayed would be the true condition 810.

In case 2 of FIG. 8, if the initial state of the checkbox GUI component is the mixed value condition (graphic image 430), then embodiments X and Y can allow for mixed value conditions. For example, in embodiment X, the order of graphical images in the rotation for the checkbox GUI component (e.g., 510, 520, or 530) can be the false condition 840, then true condition 842, and then the mixed value condition 845.

In another example, in embodiment Y of case 2, once the checkbox GUI component is selected from its initial mixed value condition 850, the checkbox GUI component will not return to the mixed value condition 850. In that case, the checkbox GUI component, when selected, will rotate between the true condition 852 and the false condition 855.

In one embodiment, the initial states of the checkbox GUI components (e.g., 510, 520, and 530) are stored in a hidden field that is a hidden INPUT tag. In addition, the current state of the checkbox GUI components (e.g., 510, 520, and 530) can be stored in hidden fields that is a hidden INPUT tag.

Returning back to FIG. 4, the various states of a radiobutton GUI component are also illustrated, in accordance with another embodiment of the present invention. Image 440 of the present embodiment exhibits a false condition for a data parameter in a radiobutton set (not shown). Image 440 contains an empty circle in the present embodiment. Image 450 exhibits a true condition for a data parameter in a radiobutton set. Image 450 contains a dot within the circle to indicate that the choice associated with the image 450 has been selected. Up to this point, the images in image 440 and 450 provide the same functionality as the standard HTML radiobutton control components.

However, the present embodiment provides an additional state or condition for the data parameter in image 460. Image 460 contains a glyphic tilde within a circle to indicate that the choice associated with the image 460 is partially selected, e.g., expressing a mixed value condition.

Figure 6A:
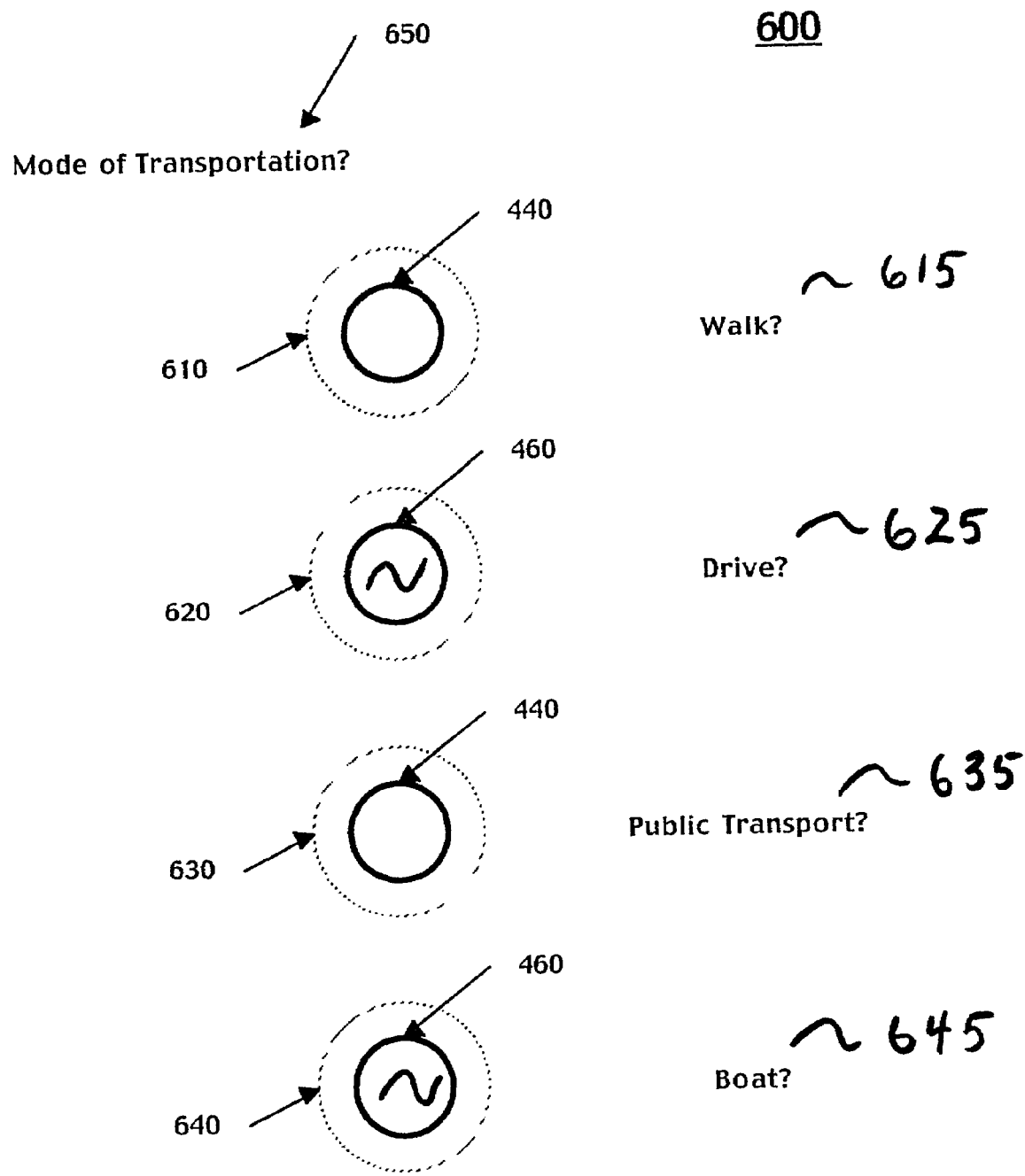
FIG. 6A is a diagram of a radiobutton set illustrating radiobutton control components in a mixed mode of operation, in accordance with one embodiment of the present invention.
Figure 6B:
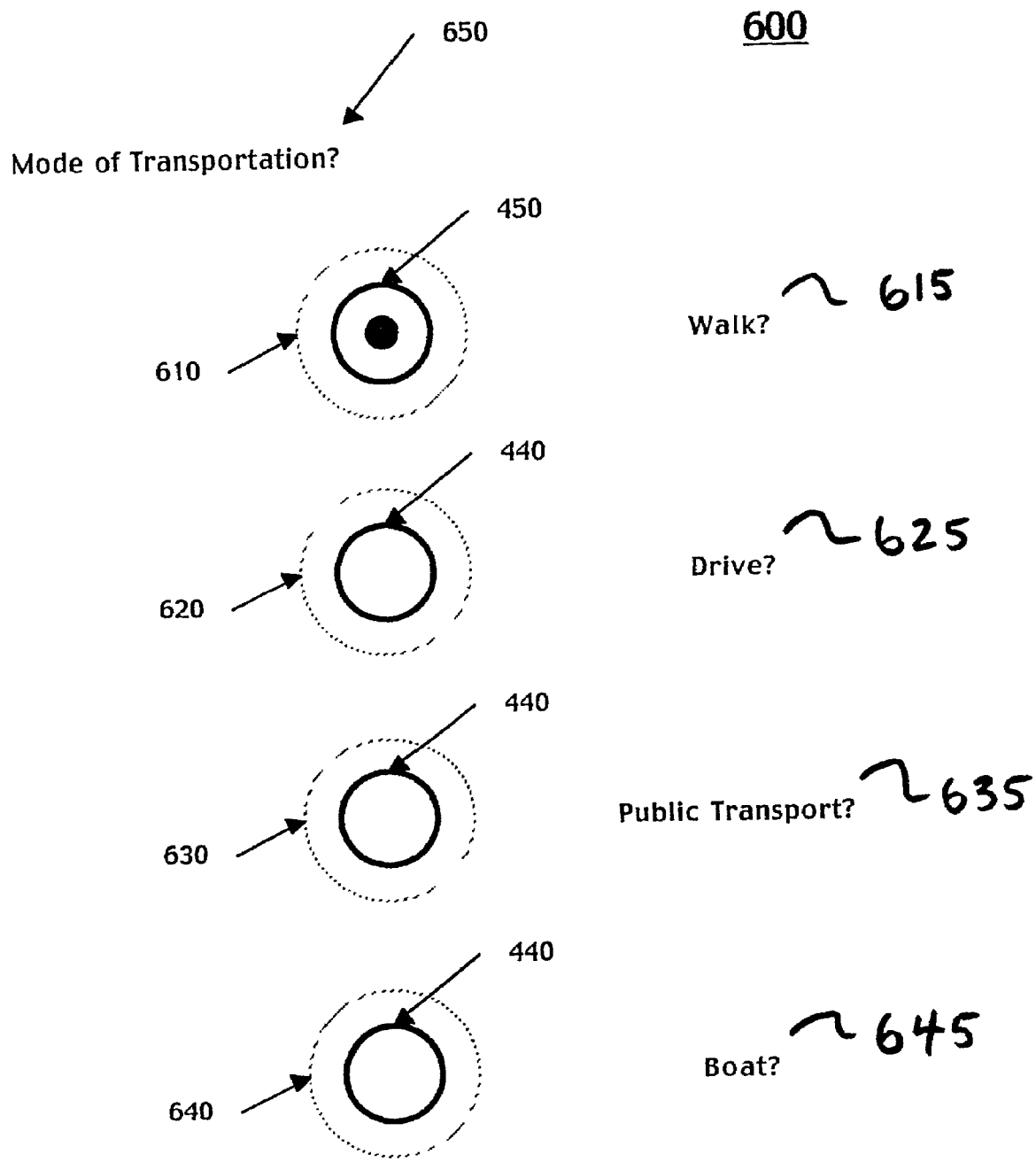
FIG. 6B is a diagram of a radiobutton set illustrating radiobutton control components in a normal mode of operation, in accordance with one embodiment of the present invention.

FIG. 6B illustrates a radiobutton set 600 where a data parameter represented by a label 650 for the radiobutton set 600 is tracking the preferred mode of transportation for a group of objects. In the radiobutton set 600, a plurality of N choices, where N=4, describing modes of transportation is presented. The radiobutton set 600 includes radiobutton GUI components 610, 620, 630, and 640 corresponding to the N choices for the data parameter 650. The radiobutton set 600 can be presented to a user through a web page over the Internet.

Usually, only one of the N choices is available for selection for normal mode of operation. When one of the N choices is selected, the graphical image 450, a circle with a dot (a true condition), is displayed in the associated control component. All the other control components in the radiobutton set 600 would exhibit a false condition and graphical image 440, an empty circle, is displayed in those control components.

Figure 9:
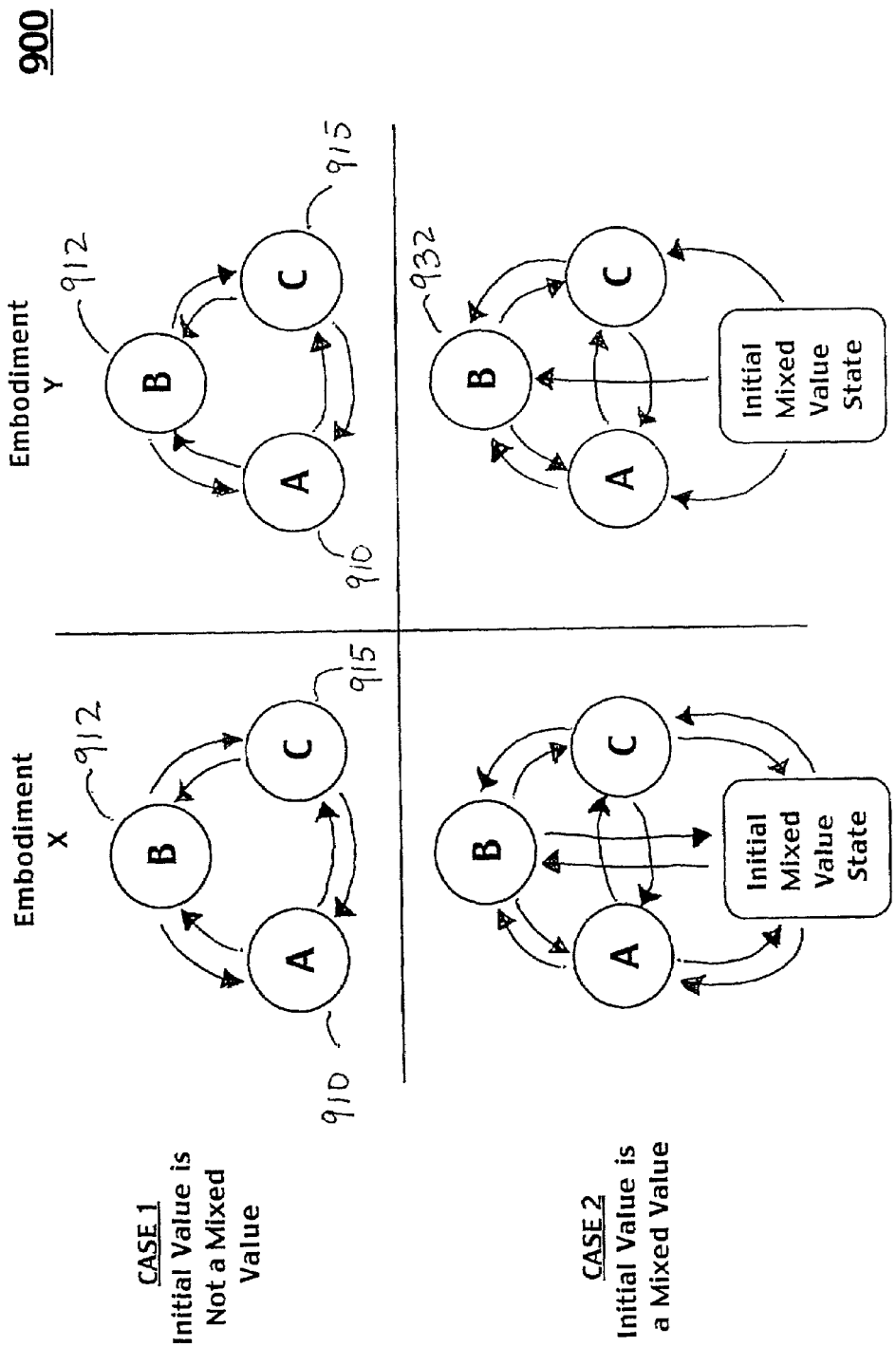
FIG. 9 is a diagram illustrating transition states for a radiobutton control component, in accordance with one embodiment of the present invention.

Referring now to FIG. 9, a state transition diagram 900 is shown illustrating both normal modes of operation and a mixed value mode of operation for a radiobutton set having three choices A, B, or C (N=3), in accordance with embodiments of the present invention. Although exemplary FIG. 9 shows transition states for a three choice radiobutton set, the flow of transition states can be extended to radiobutton sets having more than or less than three choices. In FIG. 9, two cases are presented for both embodiments X and Y. Case 1 illustrates the normal mode of operation. In both embodiments X and Y, in the normal mode of operation for case 1, the initial value of a radiobutton set is not a mixed value. As such, one of the choices A, B, or C would be selected, and in a true condition (image 450).

Thereafter, when selecting one of the N choices in the radiobutton set, the radiobutton set would exclusively display the selected choice (e.g., either A, B, or C). For example, no matter which of the choices of the radiobutton set 600 is currently displayed, when selecting A 910, A 910 would be exclusively selected and displayed in a true condition (image 450).

FIG. 6A illustrates the case where a mixed value condition is presented for the data parameter in label 650, mode of transportation, in accordance with one embodiment of the present invention. In the present embodiment, FIG. 6A illustrates the initial state of the radiobutton set 600. Instead of presenting one of N choices for selection, graphical image 460 allows for mixed value mode of operation to be selected, where some and not all in the group of objects use one mode of transportation. Others in the group of objects may or may not use another mode of transportation. When a mixed value condition is presented for at least one of the control components in the radiobutton set 600, none of the remaining control components in the radiobutton set 600 can express a true condition.

For the radiobutton set 600, radiobutton GUI component 610 displays whether a preferred mode of transportation is walking. The radiobutton GUI component 610 is associated with the component label 615, "Walk?" The graphical image 440, an empty circle, is selected in FIG. 6A and displayed for the radiobutton GUI component 610 to indicate that none in the group of objects prefer to walk in the initial state of radiobutton set 600.

Radiobutton GUI component 620 displays whether a preferred mode of transportation is driving. The radiobutton GUI component 620 is associated with the component label 625, "Drive?" The graphical image 460, a circle with a glyphic tilde, is selected in FIG. 6A and displayed for the radiobutton GUI component 620 to indicate that some in the group of objects prefer to drive, in the initial state of radiobutton set 600.

Radiobutton GUI component 630 displays whether a preferred mode of transportation is public transport. The radiobutton GUI component 630 is associated with the component label 635, "Public Transport?" The graphical image 440, an empty circle, is selected in FIG. 6A and displayed for the radiobutton GUI component 630 to indicate that none in the group of objects prefer to use public transport, in the initial state of the radiobutton set 600.

Radiobutton GUI component 640 displays whether a preferred mode of transportation is by boat. The radiobutton GUI component 640 is associated with the component label 645, "Boat?" The graphical image 460, a circle with a glyphic tilde, is selected in FIG. 6A and displayed for the radiobutton GUI component 640 to indicate that some in the group of objects prefer to use a boat for transportation, in the initial state of the radiobutton set 600.

Similarly, when a true condition is selected for one of the control components in the radiobutton set 600, all of the remaining control components in the radiobutton set 600 must express a false condition. For example, the radiobutton set 600 in FIG. 6B illustrates a current state where the preferred mode of transportation of the objects portrayed by the label 650 is by walking. In this case, the radiobutton GUI component 610 displays the graphical image 450, a circle within a circle to indicate that all in the group of objects prefer to walk. The remaining control components 620, 630 and 640 display the graphical image 440, an empty circle, to indicate a false condition.

Embodiments of the present invention employ various means to effectuate coordinating the various conditions of the control components in the radiobutton set 600. In one embodiment, the radiobutton set 600 can proceed from a normal mode of operation back to the initial mixed value mode of operation by clicking on a control component in the radiobutton set 600, if the radiobutton set 600 originally expressed a mixed value condition. More specifically, if the current state of a control component in the radiobutton set 600 is true, clicking once on that control component returns the radiobutton set 600 to a mixed value mode of operation. In that case, the initial mixed value state (e.g., FIG. 6A) would be displayed. Also, if the state of a control component is false, clicking twice on that control component again returns the radiobutton set 600 to a mixed value mode of operation.

The state transition diagram 900 of FIG. 9 illustrates the transition between normal mode of operation back to the initial mixed value mode of operation in embodiments X and Y of case 2. In embodiment X, the three choice (A, B, or C) radiobutton set 600 is able to switch back and forth between normal and mixed modes of operation. For example, when the current state of the radiobutton set 600 is showing the initial mixed value state, selecting any one of the choices A, B, or C would switch to a normal mode of operation and the selected choice (e.g., A 920, B 922, or C 925) would be displayed. More specifically, the radiobutton set 600 returns back to a normal mode of operation from the mixed value mode by clicking on any control component in the radiobutton set 600. For example, by clicking on the control component 610 of FIG. 6A that is operating in a mixed value mode, the resulting state of the radiobutton set 600 is presented in FIG. 6B. FIG. 6B shows that the radiobutton control component 610 is true and the remaining control components exhibit a false condition.

Correspondingly, in a normal mode of operation, by selecting the currently displayed choice again, the radiobutton set would revert back to a mixed mode of operation, and display the initial mixed value state for the radiobutton set. For example, once the radiobutton set 600 is operating in a mixed value mode of operation, only selected control components in the radiobutton set 600 can be selected to represent a mixed value condition. Those control components able to display a mixed value condition are determined by the initial state of that control component. If the initial state of a radiobutton GUI component in the radiobutton set 600 is the mixed value condition (graphic image 460), this indicates that the associated radiobutton GUI component can represent mixed value conditions. For example, if FIG. 6A represented initial states of the radiobutton control components in the radiobutton set 600, then only the radiobutton control component 620 and 640 could represent mixed value conditions. The remaining control components 610 and 630 would remain in a false condition.

In still another embodiment, once the radiobutton set 600 is operating in a normal mode of operation, the radiobutton set does not return to a mixed value mode of operation. Embodiment Y of case 2 of FIG. 9 illustrates the transition states that does not allow for returning to a mixed value mode of operation. In FIG. 9, once a choice A 930, B 932, or C 935 is selected from the initial mixed value state of the three choice radiobutton set, the normal mode of operation proceeds, as illustrated by case 1 of FIG. 9.

For a radiobutton condition, selecting the current state or condition of a radiobutton GUI component in a radiobutton set 600 for a given data parameter, such as, mode of transportation for data parameter 650, can be invoked with a JavaScript routine, in accordance with one embodiment of the present invention. For example, the current state of the data parameter 650 illustrated by the radiobutton set 600 can be selected through user input, e.g., clicking on the radiobutton GUI components in the radiobutton set 600. The user input (e.g., a click on the radiobutton GUI components) invokes a JavaScript routine associated with the radiobutton GUI components in the radiobutton set 600 to allow a user to select the condition of the radiobutton control components in the radiobutton set 600.

As in the case for checkbox GUI components, in one embodiment, the initial states of the radiobutton GUI components (e.g., components 610, 620, 630, and 640) are stored in hidden fields, such as a hidden INPUT tag. In addition, the current state or condition of the radiobutton set 600 can be stored in a hidden field that is a hidden INPUT tag.

Figure 7:
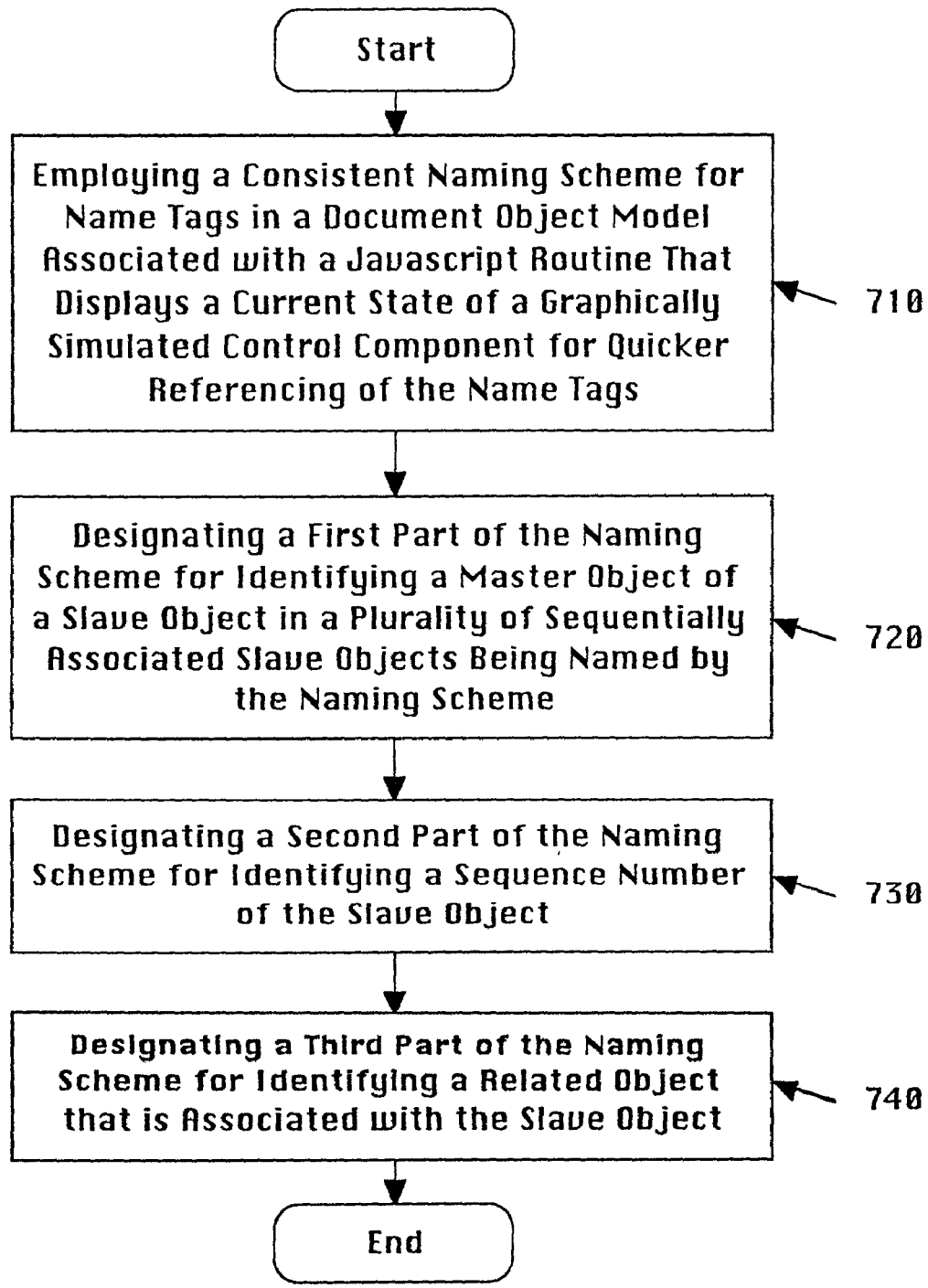
FIG. 7 is a flow chart illustrating steps in a method for employing a consistent naming scheme for name tags in a document object model that is associated with a JavaScript routine that displays current conditions for GUI control components, in accordance with one embodiment of the present invention.

FIG. 7 is a flow chart 700 illustrating steps in a method for referencing objects within a document object model (DOM) by using a multipart naming scheme within the context of associative-array indexing, in accordance with one embodiment of the present invention. The naming scheme is used for tags on an HTML web page for more concise referencing. The naming scheme is employed in such a way such that master tags and their sequentially ordered associated slave tags are easily referenced, especially in a document object model (DOM) of the HTML web page.

The present embodiment employs a naming scheme for uniquely naming referenced objects in grouped, master-slave relationships. In the association between a master and the sequentially ordered associated slaves, a relationship exists between the master object and the associated slave objects. The slave objects are one or more objects of the same type, and of some common association or relation with the master object.

The present embodiment employs multiple parts to the naming scheme. A first part is for identifying the master object, e.g., the name of the group of multiple objects. A second part is for identifying a particular slave instance, e.g., the position in the sequence for the slave object. The sequence can be denoted by a particular slave index number N. A third part is for identifying the slave object type, e.g., the name of the type of slave object.

The parts to the naming scheme are concatenated to create a name for the associative-array indexing that incorporates the aforementioned three parts. In addition, the three parts can be concatenated in any order. Further, other embodiments are well suited to a naming scheme having more or less parts for identifying objects within the DOM.

Names conforming to this naming scheme are statically defined for static objects in an HTML web page. In addition, names conforming to this scheme are also constructed on-the-fly for de-referencing by running code.

More particularly, the naming scheme exploits the capability of the JavaScript runtime environment to lookup named objects associatively. As such, the present embodiment allows references in its code to be compact and concise by utilizing the functionality of the JavaScript runtime environment.

For referencing, indexing of the named objects is possible within the environment's associative-array of named objects. In particular, associative-array indexing is implemented in the JavaScript interpreter's associative-array code. The JavaScript interpreter is fast, compiled code. The present embodiment can be more efficient in performance over the traditional hand-coded sequential searching methods that are performed and executed in the slower interpreted environment of JavaScript. Also, since the JavaScript interpreter's associative-array code has already been debugged by the browser manufacturer, the referencing method in the present embodiment is less bug-prone and faster to implement than traditional methods.

Naming of tags on an HTML web page is typically done by augmenting the tags with a NAME attribute with some text value. The value is considered in the DOM to be the name of the object created by that tag. The DOM is a data structure that arises internally within the execution environment (typically inside a web browser) when a web page is rendered. Software code executing within the execution environment (e.g., JavaScript) has access to the DOM for examining and setting the values of tag attributes to effect the objective of the software code.

Returning back to FIG. 7, the present embodiment employs a consistent naming scheme for name tags in a DOM that is associated with the JavaScript routine used for displaying a current state or condition of a GUI control component (e.g., a checkbox or radiobutton), in step 710. The consistent naming scheme is employed for more concise referencing of the name tags.

In step 720, the present embodiment proceeds by designating a first part of the naming scheme for identifying a master object of a slave object in a plurality of sequentially associated slave objects being named by the naming scheme.

In step 730, the present embodiment proceeds by designating a second part of the naming scheme for identifying a sequence number of the slave object. For example, the naming scheme described in steps 720 and 730 can be shown in a pattern "x-n," where x is replaced by the name of the master, and n is replaced by the sequence number of the slave object in question.

In still another embodiment, a third part of the naming scheme is designated for identifying a related object that is associated with slave objects that are named according to the above "x-n" pattern in step 740. For example, the naming scheme can be shown in a pattern "x-zz-n," where x is replaced by the name of the master, and n is replaced by the sequence number of the slave object in question, as discussed above. In addition, z is replaced by the keyword identifying the type of related object. In this way, the relationship between the related object, the corresponding slave, and the master is established.

While embodiments of the present invention are presented using sequential numeric ordering, other embodiments are well suited to other sequential ordering methods other than numbers.

Furthermore, while embodiments of the present invention are presented in the pattern "x-zz-n," as described above, other embodiments are well suited to naming schemes incorporating variations of the pattern "x-zz-n." In other words, the naming of the first, second, and third parts of the naming scheme is by convention only for purposes of identification and is not meant to imply any order within the naming scheme.

In another embodiment, the first and second parts of the naming scheme are concatenated together with the symbol "-" to form a string of characters comprising name tags. In addition, the first, second, and third parts of the naming scheme can be concatenated together with the symbol "-" to form a string of characters comprising name tags. Other embodiments of the present invention are well suited to incorporating or using other symbols for separation, or no symbol at all.

Furthermore, the use of the string of characters in program code facilitates the location of a name tag named according to the naming scheme of the present invention in a DOM associated with a web page. As such, the naming scheme is unique such that program code related to and employing such sequential associations are simpler to read, write, modify, and debug. Further, the program code is shorter in length, and faster to execute. An added benefit to the naming scheme is that associated web pages, in which the program code is embedded, are shorter, thus reducing download times for those web pages.

While the methods of embodiments illustrated in flow charts 300 and 700 show specific sequences and quantity of steps, the present invention is suitable to alternative embodiments. For example, additional steps can be added to the steps presented in the present embodiment. Likewise, the sequences of steps can be modified depending upon the application. Likewise, the sequence can be varied, and the symbols and encodings of the various parts of a name can be varied.

Embodiments of the present invention, a method and system for graphically simulating an HTML input control component with web based graphical control components, is thus described. While the present invention has been described in particular embodiments, it should be appreciated that the present invention should not be construed as limited by such embodiments, but rather construed according to the below claims.

What is claimed is:

1. A method, comprising:
    displaying a markup language based web page on a computer display, wherein the web page includes a control component, wherein the control component displays one or more selection options, wherein each selection option of the one or more selection options is associated with a respective condition, wherein a particular selection option of the one or more selection options is settable to each one of a set of truth values corresponding to a particular condition including a true value, a false value, and a partially true value, wherein the partially true value indicates that at least one of a plurality of parameters for the particular condition is true and at least another of the plurality of parameters is false;
    receiving input directly via the particular selection option of the control component; and
    in response to said receiving, setting the truth value corresponding to the particular selection option to the partially true value without receiving user input specific to any of the plurality of parameters.

2. The method as recited in claim 1, wherein the control component comprises one or more JavaScript routines.

3. The method as recited in claim 1, further comprising:
    in response to additional inputs corresponding to another selection option of the one or more selection options, cycling through a set of two or more truth value settings of the another selection option in a first sequence.

4. The method as recited in claim 3, wherein the first sequence includes the true value, the false value, and the partially true value.

5. The method as recited in claim 3, wherein the first sequence excludes the partially true value.

6. The method as recited in claim 1, further comprising:
    associating a first graphical image with the true value, a second graphical image with the false value, and a third graphical image with the partially true value; and
    in response to said receiving, displaying the third graphical image in a portion of the web page associated with the particular selection option.

7. The method as recited in claim 1, wherein the control component comprises a set of radio buttons.

8. The method as recited in claim 1, wherein the control component comprises a checkbox.

9. The method as recited in claim 1, further comprising:
    representing the truth value corresponding to the particular selection option in a hidden field associated with the control component.

10. A system, comprising:
    a processor;
    a memory coupled to the processor, wherein the memory comprises program instructions executable by the processor to:
        display a markup language based web page on a computer display, wherein the web page includes a control component, wherein the control component displays one or more selection options, wherein each selection option of the one or more selection options is associated with a respective condition, wherein a particular selection option of the one or more selection options is settable to each one of a set of truth values corresponding to a particular condition including a true value, a false value, and a partially true value, wherein the partially true value indicates that at least one of a plurality of parameters for the particular condition is true and at least another of the plurality of parameters is false;
        receive input directly via the particular selection option of the control component; and
        in response to the input, set the truth value corresponding to the particular selection option to the partially true value without receiving user input specific to any of the plurality of parameters.

11. The system as recited in claim 10, wherein the control component comprises one or more JavaScript routines.

12. The system as recited in claim 10, wherein the instructions are further executable to:
    in response to additional inputs received via the input interface, cycle through two or more truth value settings of the particular selection option in a predetermined sequence.

13. The system as recited in claim 12, wherein the predetermined sequence includes the true value, the false value, and the partially true value.

14. The system as recited in claim 12, wherein the predetermined sequence excludes the partially true value.

15. The system as recited in claim 10, wherein the instructions are further executable to:
    associate a first graphical image with the true value, a second graphical image with the false value, and a third graphical image with the partially true value; and
    in response to receiving the input, display the third graphical image in a portion of the web page associated with the particular selection option.

16. The system as recited in claim 10, wherein the control component comprises a set of radio buttons.

17. The system as recited in claim 10, wherein the control component comprises a checkbox.

18. A tangible, computer readable storage medium, comprising program instructions, wherein the instructions are computer-executable to:
    display a markup language based web page on a computer display, wherein the web page includes a control component, wherein the control component displays one or more selection options, wherein each selection option of the one or more selection options is associated with respective condition, wherein a particular selection option of the one or more selection options is settable to each one of a set of truth values corresponding to a particular condition including a true value, a false value, and a partially true value, wherein the partially true value indicates that at least one of a plurality of parameters for the particular condition is true and at least another of the plurality of parameters is false;
    receive input directly via the particular selection option of the control component;
    in response to the input, set the truth value corresponding to the particular selection option to the partially true value without receiving user input specific to any of the plurality of parameters.

19. The computer readable medium as recited in claim 18, wherein the control component comprises one or more JavaScript routines.

20. The computer readable medium as recited in claim 18, wherein the instructions are further executable to:
    in response to additional inputs received via the input interface, cycle through two or more truth value settings of the particular selection option in a predetermined sequence.

21. The computer readable medium as recited in claim 20, wherein the predetermined sequence includes the true value, the false value, and the partially true value.

22. The computer readable medium as recited in claim 20, wherein the predetermined sequence excludes the partially true value.

23. The computer readable medium as recited in claim 18, wherein the instructions are further executable to:
   associate a first graphical image with the true value, a second graphical image with the false value, and a third graphical image with the partially true value; and
   in response to receiving the input, display the third graphical image in a portion of the web page associated with the particular selection option.

24. The computer readable medium as recited in claim 18, wherein the control component comprises a set of radio buttons or a checkbox.

25. A tangible, computer readable storage medium, comprising program instructions, wherein the instructions are computer executable to:
   display a markup language based web page, wherein the web page includes references to a plurality of objects, including a master object and one or more sequentially ordered slave objects associated with the master object;
   receive input via an input interface for the web page; and
   in response to the input, modify an attribute of a particular slave object of the one or more slave objects, wherein said modifying comprises:
      generating a text string representing a name of the particular slave object, wherein said generating comprises concatenating a name string associated with the master object and a sequence indicator corresponding to the particular slave object; and
      looking up the particular slave object within a document object model of the web page using the text string as an index into an associative array of named objects.

26. The computer readable medium as recited in claim 25, wherein the master object comprises a control component, wherein the control component displays one or more selection options, wherein each of the sequentially ordered slave objects is associated with a corresponding selection option of the one or more selection options.

27. The computer readable medium as recited in claim 26, wherein each selection option of the one or more selection options is associated with a corresponding truth value from a set of possible truth values, wherein the set of possible truth values for a particular selection option of the one or more selection options includes a true value, a false value, and a partially true value.

28. The computer readable medium as recited in claim 27, wherein said particular slave object corresponds to said particular selection option, wherein the instructions are further executable to:
   set the truth value of the particular selection option to the partially true value, wherein said setting comprises said modifying the attribute of the particular slave object.

29. The computer readable medium as recited in claim 25, wherein the master object corresponds to a radio button control component or a checkbox control component.

30. The method as recited in claim 3, wherein the number of distinct truth value settings in the first sequence is determined by an initial truth value setting of the selection option.

31. The method as recited in claim 3, wherein the one or more selection options includes an additional selection option, further comprising:
   in response to additional inputs corresponding to the additional selection option, cycling through an additional set of two or more truth value settings in a second sequence, wherein the number of distinct truth value settings in the second sequence differs from the number of distinct truth value settings in the first sequence.

* * * * *

UNITED STATES PATENT AND TRADEMARK OFFICE
CERTIFICATE OF CORRECTION

| | | |
|---|---|---|
| PATENT NO. | : 7,181,700 B2 | Page 1 of 1 |
| APPLICATION NO. | : 10/163218 | |
| DATED | : February 20, 2007 | |
| INVENTOR(S) | : Jaime F. Guerrero | |

It is certified that error appears in the above-identified patent and that said Letters Patent is hereby corrected as shown below:

<u>In the Title: Item (54)</u>

Please delete "HYPETEXT" and insert --HYPERTEXT-- in place thereof.

Signed and Sealed this

Fifteenth Day of May, 2007

JON W. DUDAS
*Director of the United States Patent and Trademark Office*